United States Patent [19]

Oldershaw et al.

[11] Patent Number: 5,289,307
[45] Date of Patent: Feb. 22, 1994

[54] IMAGE SCANNER

[75] Inventors: Robert J. Oldershaw, Norfolk; Sinclair Morgan; Martin P. Gouch, both of Herts, all of England

[73] Assignee: Crosfield Electronics Ltd., Herts, United Kingdom

[21] Appl. No.: 968,322

[22] Filed: Oct. 29, 1992

[30] Foreign Application Priority Data

Oct. 29, 1991 [GB] United Kingdom ............. 9122899.9

[51] Int. Cl.$^5$ .............................................. G02B 26/08
[52] U.S. Cl. ................................... 359/196; 359/211; 359/349; 358/490
[58] Field of Search ............... 359/196, 209, 211, 220, 359/216, 217, 218, 219, 890, 891, 349, 212; 358/475, 480, 487, 488, 490

[56] References Cited

U.S. PATENT DOCUMENTS

| | | | |
|---|---|---|---|
| 3,502,888 | 3/1970 | Stites | 359/212 |
| 4,008,967 | 2/1977 | Kiemle | 359/196 |
| 4,831,333 | 5/1989 | Welch | 359/349 |
| 5,126,836 | 6/1992 | Um | 359/209 |

FOREIGN PATENT DOCUMENTS 3412723 12/1985 Fed. Rep. of Germany .

Primary Examiner—Loha Ben
Attorney, Agent, or Firm—Sughrue, Mion, Zinn, Macpeak & Seas

[57] ABSTRACT

A scanner comprises apparatus for scanning an image in a series of scanlines with a beam. Beam splitters split the modulated beam into a number of subsidiary beams which are fed to respective detectors. In one example (FIG. 2), a set of masks are provided to divide the subsidiary beam spatially such that different portions of the beams are fed to respective detectors. In another example (FIG. 4), a color filter splits the modulated beam into its respective color components and, after this beam has been split into subsidiary beams, the individual color components are filtered by filters and fed to detectors.

9 Claims, 2 Drawing Sheets

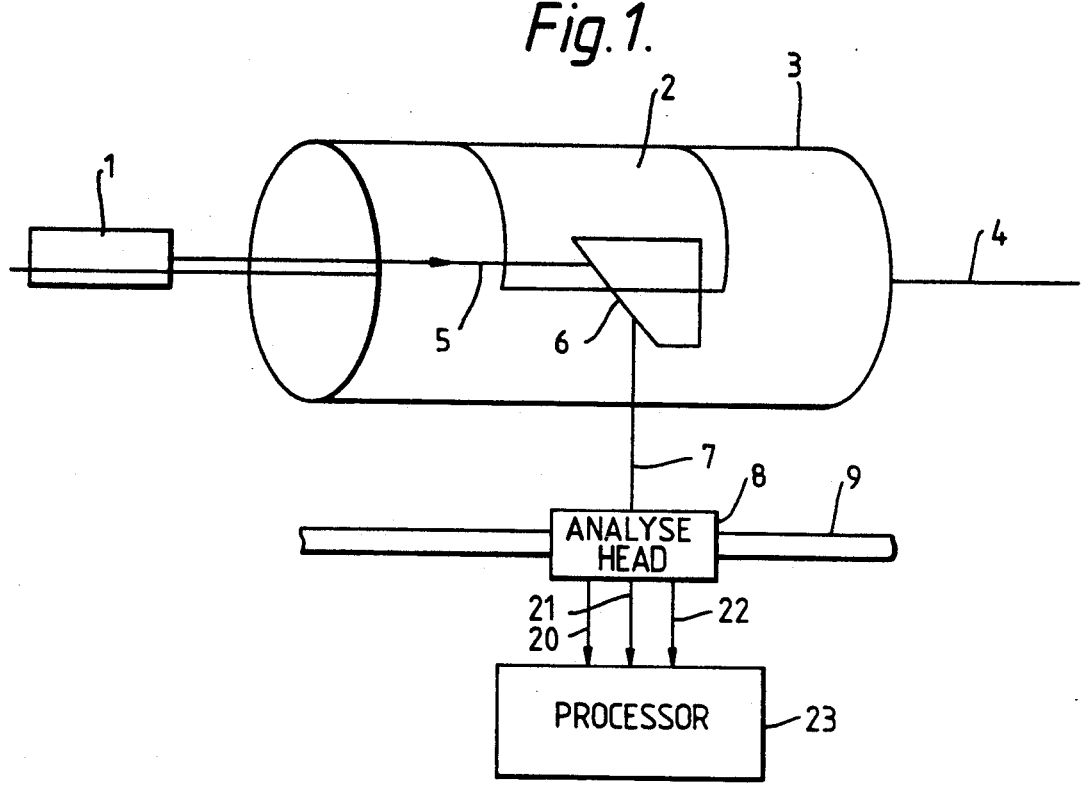
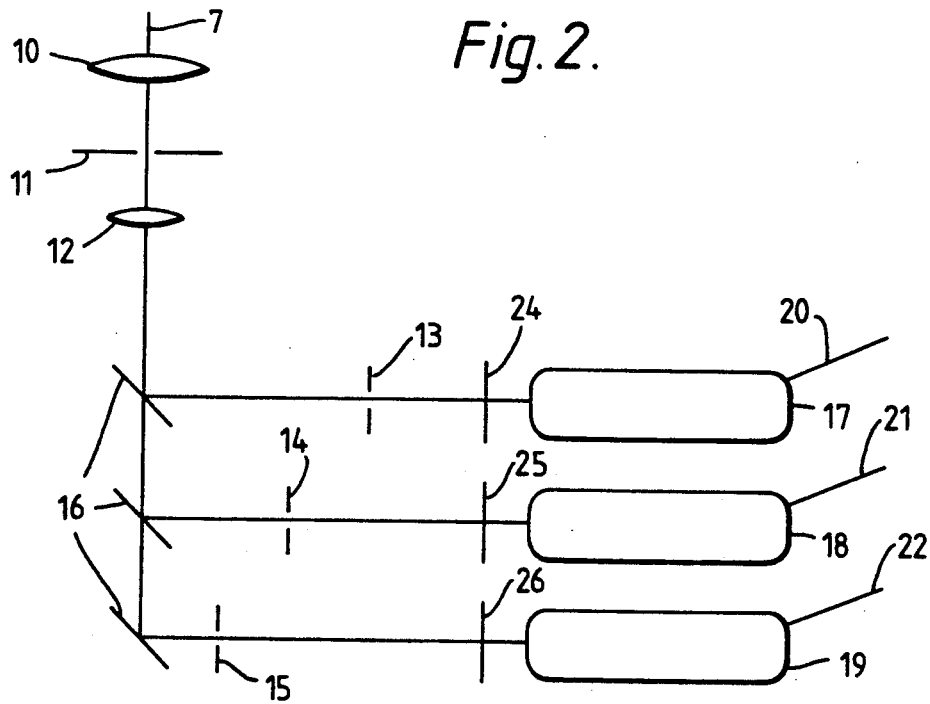

IMAGE SCANNER

FIELD OF THE INVENTION

This invention relates to scanners for use in scanning images such as linework.

DESCRIPTION OF THE PRIOR ART

Conventional colour scanners may be used in two modes. One is to scan colour transparencies using three colour channels, and another one to scan fine monochrome "linework" text. The scanning resolution for the linework scan is much higher than for the colour transparency scan and so the productivity of the linework scan is very poor.

SUMMARY OF THE INVENTION

In accordance with the present invention, a scanner comprises means for scanning an image in a series of scan lines with a scanning beam; means for splitting the beam after modulation by the image into a number of subsidiary beams; a corresponding number of detectors to each of which a respective subsidiary beam is fed; and control means for causing spatially different respective parts of the subsidiary beams to be received by each detector.

The present invention enables an image scanner, such as a conventional colour scanner, to be used efficiently to scan high resolution monochrome data, without optical modification, by increasing the amount of image data obtained in a single pass of the scanner. For a three channel colour scanner a three times productivity increase results if each of the light detectors is masked so as to detect a spatially different portion of the data passed through the scanning aperture. In this way for each pass (or revolution in the case of a drum scanner) discrete lines of data would be collected simultaneously.

In one example, the control means comprises a set of masks, one for each subsidiary beam, the masks being positioned to cause spatially different parts of the subsidiary beams to impinge on the respective detectors. Typically, the beam is focussed onto the set of masks which will be conjugate with an initial, sampling aperture upstream of the lens.

In a second example, the control means comprises a colour filter which converts the beam after modulation into a number of different colour components which are spatially separated across the width of the resultant beam, and a corresponding set of colour filters, one associated with each detector and positioned downstream of the beam splitting means so as to filter out all but the colour associated with that colour filter which is then allowed to impinge on the respective detector.

This latter example is particularly useful in that the scanner can be readily adjusted for conventional colour image scanning by removing the colour filter.

Typically, the scanning beam will be white light although this is not essential. The detectors can be simple photodetectors or photomultipliers.

The number of detectors is dependent upon the uses of the image scanner. More than one detector is required and if the scanner is to scan a colour image then preferably the scanner comprises three detectors. In this case, colour filters are preferably positioned between the detectors and the control means to separate the colour components of a scanned image. These filters may be left in place when scanning a monochrome image.

BRIEF DESCRIPTION OF THE DRAWINGS

Two examples of image scanners in accordance with the present invention will now be described with reference to the accompanying drawings, in which:

FIG. 1 shows a block diagram of an image scanner;

FIG. 2 shows in more detail the optics of the scanning head in one example of the scanner of FIG. 1;

DETAILED DESCRIPTION OF THE EMBODIMENTS

Figure 3:
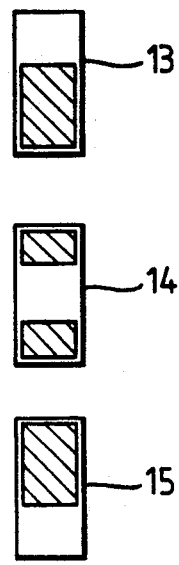
FIG. 3 shows the masks used in FIG. 2.

The scanner shown in FIG. 1 comprises a transparent, rotatably mounted drum 3 on which is mounted a transparency 2. A white light source 1, generates a beam 5 which is supplied parallel with the axis 4 of the drum 3 to a non-rotating, reflecting prism 6 mounted within the drum 3. The beam 5 is reflected by the prism 6 radially outwardly passing through the cylinder 3 and, where it passes through the transparency 2, being modulated to generate a modulated scanning beam 7 which is received by a scanning head 8. The scanning head 8 is mounted on a lead screw 9 while the prism 6 is also axially movable with the head 8. The drum 3 rotates at relatively high speed so that the transparency 2 is scanned in a series of axially offset scanlines. The arrangement so far described is conventional and can be found in our Crosfield Magnascan analyse drum scanners.

FIG. 2 illustrates one example of the optics mounted within the analyse head 8 according to the invention. As can be seen in FIG. 2, the incoming, modulated scanning beam 7 impinges on an imaging lens 10, and is imaged on to a sampling aperture 11 as in conventional scanners. The beam then impinges on a lens 12 which focusses the beam onto a set of masks 13–15. The masks 13–15 are positioned downstream of respective beam splitters 16 and are arranged to be co-conjugate with the sampling aperture 11.

It will be seen therefore that a copy of the incoming modulated beam is supplied via the beam splitter 16 as respective subsidiary beams to the masks 13–15. Usually, for efficiency the beam splitter is a dichroic system with the result that different colour components of the original beam are supplied to the masks 13–15.

Those portions of the beams which pass through the masks 13–15 then impinge on respective photomultiplier detectors 17–19. Again, the photomultipliers 17–19 are similar to those found in conventional colour, analyse scanners.

The function of the masks 13–15 is to mask out respectively different portions of the subsidiary beams fed from the beam splitter 16 so that spatially separate portions of the original, modulated beam 7 impinge on the photomultipliers 17–19. Examples of the masks 13–15 to achieve this are shown in FIG. 3. Thus, as can be seen in FIG. 3, the mask 13 permits only the top third of the corresponding subsidiary beam to pass through the photomultiplier 17; the mask 14 allows the central portion of the beam to pass to the photomultiplier 18; and the mask 15 permits only the lower third of the beam to pass to the photomultiplier 19.

The photomultipliers 17–19 act in a conventional manner to generate electrical signals representing the intensity of the incoming beams, these signals then being fed along lines 20–22 to processing electronics 23. Each set of signals along the lines 20–22 corresponds to a different scanline exposed simultaneously with the other two scanlines within the diameter of the original scanning beam. Consequently, a three-fold increase in scanning efficiency is achieved.

It will be noted that the invention is designed for scanning monochrome, linework. It is therefore convenient to leave in place the red, green, and blue filters 24–26 which will normally be used when the scanner is operated for conventional colour scanning. In that case, when colour scanning, all the components of FIG. 2 can be left in place except for the masks 13–15 which need to be removed. In the case of colour scanning, of course, the signals received at the same time by each photomultiplier 17–19 will relate to the same pixel in contrast to the situation when linework is being scanned when the photomultipliers 17–19 receive signals relating to different pixels simultaneously.

Figure 4:
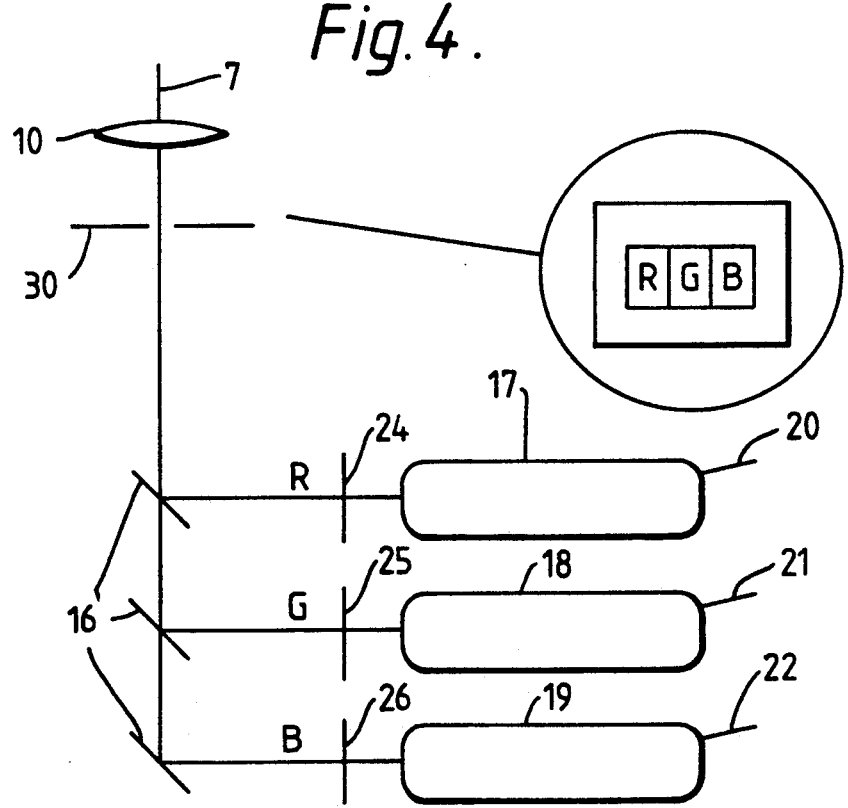
FIG. 4 shows the optics of the scanning head in a second example of the scanner in FIG. 1.

An alternative arrangement for the contents of the analyse head 8 according to the invention is shown in FIG. 4. In this case, the beam is imaged by lens 10 on to a special aperture 30 in the form of a colour filter which separates the incoming monochrome beam into its colour components, red, green, blue, those colour components being spatially offset from one another as shown in FIG. 4. This beam is then divided into subsidiary beams by the beam splitter 16, the subsidiary beams being fed via respective filters 24–26 to the photomultipliers 17–19. In this case, the use of a colour filter 30 avoids the need for the masks 13–15 by utilising filters 24–26 which are already in place in a conventional scanner. In order to convert this scanner to a conventional form, it is simply a matter of replacing the colour filter 30 by a conventional sampling aperture.

We claim:

1. An image scanner comprising means for scanning an image in a series of scan lines with a beam; means for splitting said beam after modulation by said image into a number of subsidiary beams; a corresponding number of detectors to each of which a respective one of said subsidiary beams is fed; and control means for causing spatially different respective parts of said subsidiary beams to be received by each detector.

2. A scanner according to claim 1, wherein said control means comprises a set of masks, one for each said subsidiary beam, said masks being positioned to cause spatially different parts of said subsidiary beams to impinge on said respective detectors.

3. A scanner according to claim 2, wherein said beam comprises white light.

4. A scanner according to claim 1, wherein said control means comprises a colour filter which converts said beam after modulation into a number of different colour components which are spatially separated across the width of a resultant beam, and a corresponding set of colour filters, one associated with each said detector and positioned downstream of said beam splitting means so as to filter out all but the colour associated with that colour filter which is then allowed to impinge on the respective detector.

5. A scanner according to claim 4, wherein said beam comprises white light, and wherein said colours comprise red, green and blue.

6. A scanner according to claim 4, wherein said beam comprises white light.

7. A scanner according to claim 1, wherein said beam comprises white light.

8. A scanner according to claim 1, wherein said control means is selectively actuatable or removable such that when said control means is inoperative or removed respectively, said scanner can perform a conventional colour image scanning process.

9. A scanner according to claim 1, wherein said control means is selectively actuatable or removable such that removal of said control means enables said scanner to scan a monochrome image.

* * * * *